United States Patent Office 2,925,585
Patented Feb. 16, 1960

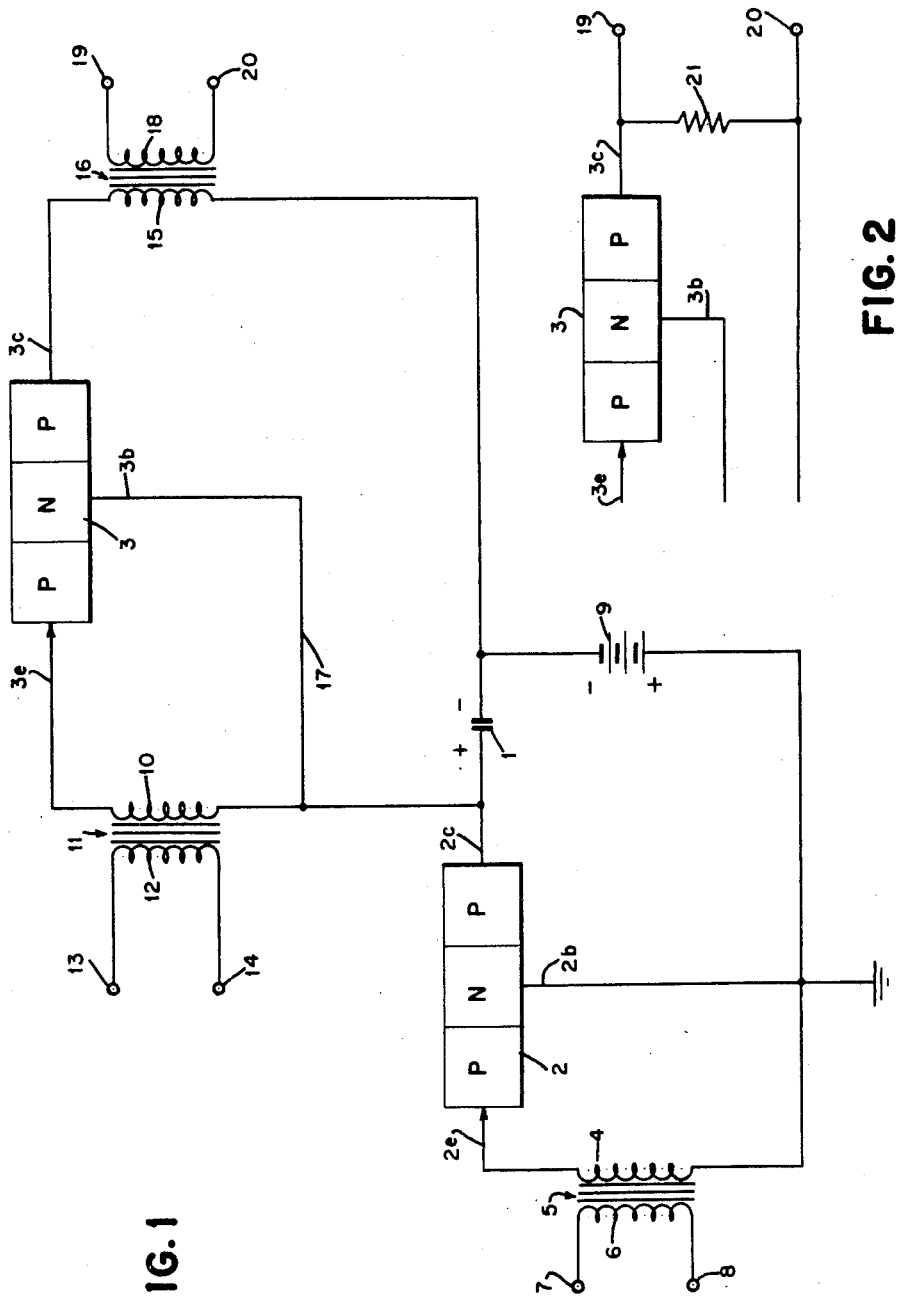

2,925,585

ELECTRIC CHARGE STORAGE APPARATUS

George D. Bruce, Poughkeepsie, N.Y., assignor to International Business Machines Corporation, New York, N.Y., a corporation of New York Continuation of application Serial No. 401,568, December 31, 1953. This application September 17, 1958, Serial No. 761,656

6 Claims. (Cl. 340—173)

This is a continuation of my copending application Serial No. 401,568, filed December 31, 1953, for Electric Charge Storage Apparatus, now abandoned.

This invention relates to electric charge storage apparatus, and especially to apparatus including transistors for charging and discharging a capacitor.

It has been proposed to use the storage of an electric charge on a capacitor as a memory device. For example, such a capacitor may have its state of charge utilized to indicate the presence of a condition. In such an arrangement, the capacitor is charged by an electric signal indicating the presence of the condition and is discharged by another signal indicating the absence of the condition.

In such an arrangement, the charging and discharging circuits must be highly non-conductive except during those times when the charging or discharging is taking place, so that the charge will not leak off of the capacitor. It is common to use vacuum tubes to control such charging and discharging, because the tubes are very effective to prevent leakage.

Transistors have recently come into use as electric translating devices broadly equivalent to relays and vacuum tubes. Transistors are preferred to relays and vacuum tubes for many applications, since they require substantially less power and substantially lower potentials. These advantages are particularly important in connection with high speed electric computers, where thousands of such translating devices may be required in a given installation. Electrostatic storage memory devices are common in such computers, but it has not previously been proposed to use transistors for control of the charging and discharging of such electrostatic memory devices, apparently because transistors are not as effective as vacuum tubes in preventing leakage of charges during inactive periods.

An object of the present invention is to provide an electric circuit for charging and discharging a capacitor including transistors to control the charging and discharging.

Another object is to provide an improved circuit for charging a capacitor.

Another object is to provide an improved circuit for discharging a capacitor.

The foregoing and other objects of the invention are attained, in the circuits described herein, by providing a capacitor, a charging circuit including a PNP junction transistor, and a discharging circuit including another PNP junction transistor. In the charging circuit, the capacitor is connected in series with a battery which tends to maintain the charge on the capacitor and thereby prevent it from leaking off. In the discharging circuit, the capacitor is connected across the base and collector electrodes of the transistor in a manner so that the discharging of the transistor is opposed by the base-collector impedance in its reverse or high impedance direction.

Other objects and advantages of the invention will become apparent from a consideration of the appended specification and claims, taken together with the accompanying drawing.

In the drawing:

Fig. 1 is a wiring diagram of an electric circuit embodying the invention; and

Fig. 2 is a fragmentary wiring diagram showing a portion of an electric circuit which may be substituted for a portion of the circuit of Fig. 1.

Referring to the drawing, there is shown a capacitor 1, a charging circuit for the capacitor 1 including a transistor 2 and a discharging circuit including a transistor 3.

Transistor 2 is provided with an emitter electrode 2e, a collector electrode 2c and a base electrode 2b. Base electrode 2b is connected directly to ground. Emitter electrode 2e is connected through the secondary winding 4 of input transformer 5 to ground. Transformer 5 has a primary winding 6 connected to a pair of input signal terminals 7 and 8. Collector 2c is connected to ground through capacitor 1 and a battery 9 in series.

The transistor 3 in the discharging circuit has an emitter electrode 3e, a collector electrode 3c and a base electrode 3b. Base electrode 3b is connected to the collector 2c of transistor 2. Emitter 3e is connected to the base 3b through a secondary winding 10 of an input signal transformer 11 having a primary winding 12. The primary winding 12 is connected to input terminals 13 and 14.

Collector 3c is connected to base 3b through an output circuit including the primary winding 15 of an output transformer 16, capacitor 1 and a wire 17. Output transformer 16 is provided with a secondary winding 18 connected to output terminals 19 and 20.

*Operation of Fig. 1*

Assume that the capacitor 1 is initially completely discharged. When a "read in" signal is applied to input terminals 7 and 8, it starts a current flowing through the emitter 2e, which in turn starts a current flowing through collector 2c, thereby charging the capacitor 1. As the capacitor charges, the collector potential decreases, since the potential between the collector and base is equal to the potential of battery 9 minus the potential built up on capacitor 1. At some value of collector potential, that potential will be insufficient to maintain the charging current, and the charging operation will cease, the particular value of collector potential involved depending upon the characteristics of the transistor. When the capacitor is charged, the charge cannot leak off through the collector base circuit of the transistor 2, since its potential is opposed in that circuit by the potential of battery 9.

After the capacitor has been charged, it may be discharged only by the application of a "read out" signal to the input terminals 13 and 14. The application of a signal of proper polarity to these terminals causes the emitter 3e to be made positive with respect to the base 3b, thereby turning on the transistor 3 and starting a flow of current through the collector 3c. This current proceeds from capacitor 1 as a source of energy, and thereby discharges that capacitor. The current flow continues until the potential across capacitor 1 is reduced to a very low value. This current flow through collector 3c produces a potential drop across winding 15 which is transmitted through transformer 16 to the output terminals 19 and 20.

Before the "read out" signal is received, a charge on capacitor 1 cannot leak off through the transistor 3, since it is connected across the base and collector of that transistor in the high impedance direction.

Summarizing, the capacitor 1 is charged in response to a "read in" signal applied at input terminals 7 and 3 and is discharged in response to a "read out" signal applied at input terminals 13 and 14. The discharge of capacitor 1 produces an output signal at terminals 19 and 20.

*Fig. 2*

This figure illustrates a modified form of circuit for the transistor 3 of Fig. 1. In Fig. 2, the discharge circuit of the capacitor includes a resistor 21 in place of the primary winding 15 of transformer 16. The action of the circuit is the same as that of the circuit in Fig. 1. The other elements in the circuit of Fig. 2 have been given the same reference numerals as their counterparts in Fig. 1, and will not be further described.

While I have shown and described certain preferred embodiments of my invention, other modifications thereof will readily occur to those skilled in the art and I therefore intend my invention to be limited only by the appended claims.

I claim:

1. Electric charge storage apparatus comprising a capacitor, a transistor including a body of semiconductive material, a base electrode in ohmically conductive contact with said body, and two electrodes in contact with said body at localities spaced from said base electrode, said body providing asymmetrically conductive paths between said two electrodes and said base electrode, an input circuit for said transistor comprising said base electrode, a first of said two electrodes, and a charging signal source shiftable between a signal condition in which it supplies a unidirectional signal poled to bias said first electrode in its low impedance direction and a no-signal condition in which it is not effective so to bias said first electrode, and an output circuit for said transistor comprising said base electrode, the second of said two electrodes, and a source of unidirectional electrical energy poled to bias said second electrode in its high impedance direction, said source of energy being effective when said signal source is in its signal condition, to transmit a current through said output circuit, means connecting said capacitor in series in said output circuit so that it is charged when said charging signal source is in its signal condition, said source of energy being effective when said signal source is in its no-signal condition to block discharge of said capacitor through said output circuit.

2. Electric charge storage apparatus comprising a capacitor, a transistor including a body of semiconductive material, a base electrode in ohmcially conductive contact with said body and two electrodes in contact with said body at localities spaced from said base electrode, said body providing asymmetrically conductive paths between said two electrodes and asid base electrode, an input circuit for said transistor comprising said base electrode, a first of said two electrodes, and a discharging signal source shiftable, between a signal condition in which it supplies a unidirectional signal poled to bias said first electrode in its low impedance directon and a no-signal condition in which it is not effective so to bias said first electrode, and an output circuit for said transistor comprising said base electrode, the second of said two electrodes, said capacitor, and signal output means shiftable between a no-signal condition and a signal condition in which it receives a unidirectional signal, means for charging said capacitor and unidirectional electric energy having a predetermined polarity, said polarity being selected so that the charge on the capacitor is effective to bias said second electrode in its high impedance direction, said signal source and said capacitor cooperating when said signal source is in its signal condition and said capacitor is charged to cause a current flow through said output circuit in a direction to discharge said capacitor, said current being effective to shift said signal output means to its signal condition, the impedance between said second electrode and said base electrode being effective when said signal source is supplying no signal to block discharge of said capacitor through said output circuit.

3. Electric charge storage apparatus comprising a capacitor, first and second transistors, each including a body of semiconductive material, a base electrode in ohmically conductive contact with said body, and two electrodes in contact with said body at localities spaced from said base electrode, said body providing asymmetrically conductive paths between said two electrodes and said base electrode, an input circuit for said first transistor comprising said base electrode, a first of said two electrodes and a read-in signal source shiftable between a signal condition in which it supplies a unidirectional signal poled to bias said first electrode in the low impedance direction and a no-signal condition in which it is not effective so to bias said first electrode; an output circuit for said first transistor comprising said base electrode, the second of said two electrodes, said capacitor and a source of unidirectional electrical energy poled to bias said second electrode in its high impedance direction; said source of energy being effective when said signal source is in its signal condition to transmit a current through said output circuit in a direction to charge said capacitor with a potential having a polarity opposed to that of the source of energy, said source of energy being effective when said signal source is in its no-signal condition to block discharge of said capacitor through said output circuit; an input circuit for said second transistor comprising said base electrode, a first of said two electrodes, and a read-out signal source shiftable between a signal condition in which it supplies a unidirectional signal poled to bias said first electrode in its low impedance direction and a no-signal condition in which it is not effective so to bias said first electrode; an output circuit for said second transistor comprising said base electrode, the second of said two electrodes, said capacitor, and signal output means shiftable between a no-signal condition and a signal condition in which it receives a unidirectional signal; the polarity of said capacitor when charged by said source of energy being effective to bias said second electrode in its high impedance direction, said read-out signal source and said capacitor cooperating when said read-out signal source is in its signal condition and said capacitor is charged to cause a current flow through said output circuit in a direction to discharge said capacitor, said current being effective to shift said signal output means to its signal condition, the impedance between said second electrode and said base electrode being effective when said read-out signal source is supplying no signal to block discharge of said capacitor through said output circuit.

4. Electric charge storage apparatus comprising a capacitor, a transistor including an input electrode, an output electrode and a common electrode, and a body of semiconductive material providing asymmetrically conductive paths between said common electrode and each of said input and output electrodes; an input circuit for said transistor comprising said input and common electrodes, and a charging signal source shiftable between a signal condition in which it supplies a unidirectional signal poled to bias the asymmetrically conductive path between said input and common electrodes in its low impedance direction, and a no-signal condition in which it is not effective so to bias said path; and an output circuit for said transistor comprising said output and common electrodes and a source of unidirectional electrical energy poled to bias the asymmetrically conductive path between said output and common electrodes in its high impedance direction, means connecting said capacitor in series in said output circuit so that it is charged when said charging signal source is in its signal condition, said source of energy being effective when said signal source is in its no-signal condition to inhibit discharge of said capacitor through said output circuit.

5. Electric charge storage apparatus comprising a capacitor, a transistor including an input electrode, an output electrode and a common electrode, and a body of semiconductive material providing asymmetrically conductive paths between said common electrode and each of said input and output electrodes; an input circuit for said transistor comprising said input and common electrodes, and a discharge signal source shiftable between a signal condition in which it supplies a unidirectional signal poled to bias the asymmetrically conductive path between said input and common electrodes in its low impedance direction, and a no-signal condition in which it is not effective so to bias said path; an output circuit for said transistor comprising said output and common electrodes and said capacitor, means for charging said capacitor with unidirectional electrical energy having a polarity such that the charge on the capacitor is effective to bias the asymmetrically conductive path between said output and common electrodes in its high impedance direction, said signal source and said capacitor cooperating when said signal source is in its signal condition and said capacitor is charged to cause a current flow through said output circuit in a direction to discharge said capacitor, the impedance between said output and common electrodes being effective when said signal source is in its no-signal condition to inhibit discharge of the capacitor through said output circuit.

6. Electric charge storage apparatus comprising a capacitor, first and second transistors, each including a body of semiconductive material, an input electrode, an output electrode and a common electrode, said body providing asymmetrically conductive paths between said common electrode and each of said input and output electrodes; an input circuit for said first transistor comprising said input and common electrodes, and a charging signal source shiftable between a signal condition in which it supplies a unidirectional signal poled to bias the asymmetrically conductive path between said input and common electrodes in its low impedance direction, and a no-signal condition in which it is not effective so to bias said path; an output circuit for said first transistor comprising said output and common electrodes and a source of unidirectional electrical energy poled to bias the asymmetrically conductive path between said output and common electrodes in its high impedance direction; and input circuit for said second transistor comprising said input and common electrodes and a discharging signal source shiftable between a signal condition in which it supplies a unidirectional signal poled to bias the asymmetrically conductive path between said input and common electrodes in its low impedance direction and a no-signal condition in which it is not effective so to bias said path; an output circuit for said second transistor comprising said output and common electrodes; means connecting said capacitor in series in both said output circuits so that it is charged when said charging signal source is in its signal condition and is discharged when said discharging signal source is in its signal condition, and signal output means connected in one of said output circuits and shiftable from a no-signal condition to a signal condition in response to a flow of current through said one output circuit.

References Cited in the file of this patent

UNITED STATES PATENTS

| | | |
|---|---|---|
| 2,175,900 | Knight | Oct. 10, 1939 |
| 2,249,819 | Gulliksen | July 22, 1941 |
| 2,284,101 | Robins | May 26, 1942 |
| 2,652,460 | Wallace | Sept. 15, 1953 |
| 2,655,609 | Shockley | Oct. 13, 1953 |
| 2,663,800 | Herzog | Dec. 22, 1953 |
| 2,666,139 | Endres | Jan. 12, 1954 |
| 2,735,011 | Dickinson | Feb. 14, 1956 |
| 2,883,454 | Sziklai et al. | Apr. 21, 1959 |